June 25, 1940. H. SAURER 2,205,493
INJECTION INTERNAL COMBUSTION ENGINE
Filed Oct. 16, 1937   2 Sheets-Sheet 1

INVENTOR,
HIPPOLYT SAURER, DECEASED
BY ROSINA SAURER HEGNER AND
ANITA ELIZABETH SAURER,
SOLE HEIRS
BY
Redding, Greeley & O'Shea
ATTORNEYS June 25, 1940.  H. SAURER  2,205,493

INJECTION INTERNAL COMBUSTION ENGINE

Filed Oct. 16, 1937   2 Sheets-Sheet 2

INVENTOR
HIPPOLYT SAURER, DECEASED
BY ROSINA SAURER HEGNER AND
ANITA ELIZABETH SAURER,
SOLE HEIRS
BY
Redding, Greeley & Shea
ATTORNEYS Patented June 25, 1940

2,205,493

UNITED STATES PATENT OFFICE 2,205,493

INJECTION INTERNAL COMBUSTION ENGINE

Hippolyt Saurer, deceased, late of Arbon, Switzerland, by Rosina Saurer-Hegner and Anita Elisabeth Saurer, sole heirs, Arbon, Switzerland, assignors to Societe Anonyme Adolphe Saurer, Arbon, Switzerland, a corporation of Switzerland Application October 16, 1937, Serial No. 169,406
In Germany April 22, 1937

1 Claim. (Cl. 123—32)

This invention relates to injection internal combustion engines of that type in which there is a fuel injection nozzle located approximately in the axis of the combustion chamber in which the charging or combustion sustaining air, hereinafter for brevity referred to as air, is supplied to the operating cylinder in a tangential direction and in which the cylinder space, that is, the space between the piston and the head of the cylinder, communicates through a central opening with a toroidal combustion chamber in the head of the piston, in which combustion chamber the air has a rotational movement during the period of injection of the fuel.

In such internal combustion engines with direct injection of fuel it is known practice to effect rotational movement about the cylinder axis of the air supplied through the inlet valve, by auxiliary means, such as a shroud on the inlet valve, special arrangement of the air inlet line, and other known means. In the conventional engine the rotational velocity of the air, however, is so regulated that during the actual injection of fuel the air moves from one fuel spray to the next. This mode of operation has the disadvantage that the exact determination of the movement of the air cannot be realized in practice throughout the entire speed range of the engine. Furthermore, in such an engine, with the fuel nozzle located in the cylinder axis, the velocity of the air at the nozzle is practically zero and as a result the fuel is heated slowly with consequent lag or retardation of ignition. It is also known practice in such engines to form a toroidal combustion chamber in the head of the piston and to provide in the surface of the piston head a restricted central opening through which must pass the air displaced from the cylinder during the compression stroke of the piston. The great radial velocity of the air thus caused to flow over the piston head to such central opening produces a movement of rotation of the air within the combustion chamber about an annular axis, in a plane perpendicular to the cylinder axis. Immediately after the piston begins its movement from the dead center position, away from the cylinder head, during the expansion stroke, such rotational movement of the air in the combustion chamber is interrupted and during the continued injection of the fuel there is no longer a definite turbulence of the air-fuel mixture in the combustion chamber. There is therefore an imperfect mixture of the fuel and air, with incomplete combustion.

It has also been proposed to combine the rotational movement of the air about the cylinder axis with the turbulence or eddying movement of the air about an annular axis within the combustion chamber, occasioned by the displacement action of the piston. In this arrangement the velocity of the air immediately about the fuel nozzle is no longer zero and as a result the fuel is heated more rapidly and the air is more uniformly mixed with the fuel in the combustion chamber. However, the disadvantage of the immediate interruption of the turbulence or eddying movement about the annular axis, immediately after the beginning of the expansion stroke of the piston, continues to be present.

In the operation of conventional engines of this type, heretofore constructed and operated, there has been a failure to realize all of the conditions necessary to smooth operation and smoke free complete combustion. Thus that all of such necessary conditions may be realized the fuel at the instant of injection from the nozzle must be enveloped immediately by hot air, in order that ignition lag shall be as small as possible, and moreover, additional air must be supplied constantly to the fuel spray throughout the continued injection of fuel and the rotational movement must not be impeded and much less be reversed by reason of the movement of the piston away from the cylinder head.

It has been found, in the development of the present invention, that the requirements necessary to smooth operation of the engine and complete combustion of the fuel can be met by either reducing the area of the inlet port, so as to increase the velocity of the air, or by modifying the surface of the piston head as hereinafter described and so reducing the velocity of the inflow of displaced air into the combustion chamber, so that the centrifugal force developed by the air as it enters the combustion chamber shall predominate over the force of the air displaced by the piston, as such air enters the combustion chamber. Thereby the air flows into the combustion chamber directly along the edge of the central opening and following the outerwall contour to the bottom of the chamber and thence back toward the injection nozzle as a central whirlwind from the bottom of the chamber.

It has been demonstrated in the operation of an engine constructed in accordance with this invention that there is added to the rotational movement of the air about the cylinder axis a supplemental movement of rotation which is continued after the piston leaves the dead center position and has begun the expansion stroke. As long as the piston moves toward the cylinder head, in the compression stroke, the air rising in such central whirlwind flows from the periphery of the central opening back again into the combustion chamber, together with additional air pressed into the chamber from the cylinder space, following the further displacement of the piston. At the beginning of the expansion stroke, the air which rises from the bottom of the combustion chamber as a central whirlwind passes through the opening of the combustion chamber into the cylinder space. There is therefore no interruption or reversal of the supplemental movement of the air upon the reversal of the movement of the piston, as heretofore, but on the contrary the passage of the central column of air from the combustion chamber to the injection nozzle is promoted and the fuel sprayed from the nozzle during the continuance of injection is thoroughly mixed with the air.

It will be obvious that various mechanical arrangements may be resorted to for the purpose of effecting the predominance of the centrifugal force of the air admitted directly from the inlet valve over the force of the air driven into the combustion chamber by displacement of the piston, whether by increasing the velocity of the air admitted directly from the inlet valve or by decreasing the velocity of the air forced into the combustion chamber by displacement of the piston. It may be that by one mode of procedure or the other there may be some slight disadvantage, but, as has been demonstrated, such disadvantage is slight and negligible as compared with the advantages secured.

The invention will be more fully explained hereinafter with reference to the accompanying drawings, in which are illustrated both of the previously suggested embodiments of the invention.

In the drawings—

Figure 1 is a view in vertical axial section of so much of an engine cylinder, cylinder head and piston with air admission and exhaust valves and a fuel injection nozzle, as is necessary to enable the invention to be understood, the piston being represented in this view in the position which it assumes just before it reaches the upper dead center position. The embodiment of the invention illustrated in this figure is that in which the predominance of the centrifugal force of the air is accomplished by reducing somewhat the area of the inlet port and so increasing the velocity of the air admitted. In this view the fuel jets are indicated conventionally by radial lines and the flow of the air is indicated by arrowheaded lines.

Figure 1:
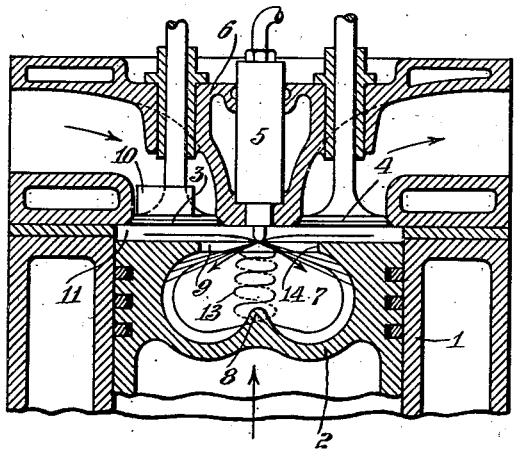
Figure 5:
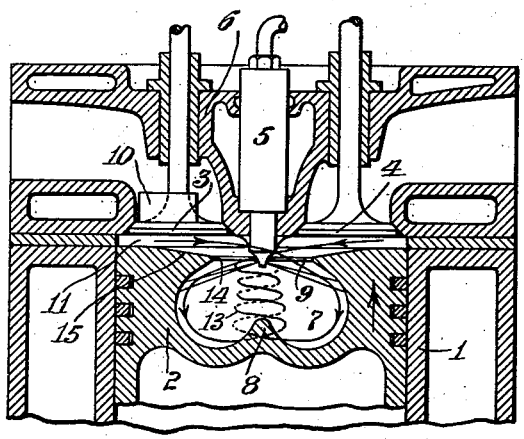

Figure 5 is a view generally similar to Figure 1, but illustrating that embodiment of the invention in which the predominance of the centrifugal force of the air admitted from the inlet valve over the force of that introduced into the combustion chamber by the displacement of the piston is accomplished by forming the piston head so as to reduce relatively the force of the air introduced into the combustion chamber by the displacement of the piston.

Figure 6:
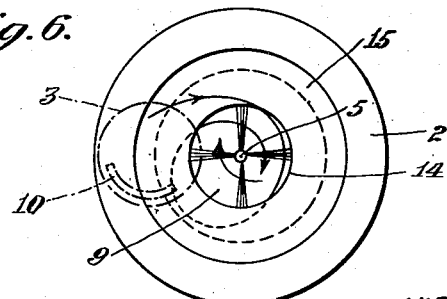

Figure 6 is a plan view of the piston head shown in Figure 5.

Figure 2:
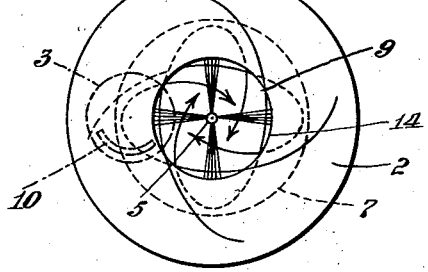
Figure 2 is a plan view of the piston head shown in Figure 1, the position of the air inlet valve being indicated by a broken line and the flow of the air by arrowheaded lines.
Figure 3:
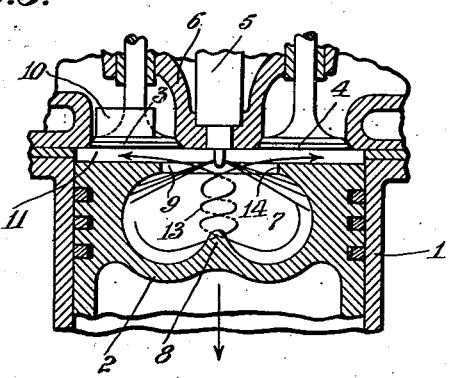
Figure 3 is a view generally similar to Figure 1, but showing the piston in the position which it assumes shortly after it has reached the upper dead center position and has commenced its expansion stroke.

In both of the illustrated embodiments of the invention the cylinder 1, the piston 2, the inlet or air supply valve 3, the exhaust valve 4, the injection nozzle 5, and the cylinder head 6 are shown as of substantially usual construction and arrangement, except that in the embodiment of the invention illustrated in Figures 1, 2 and 3 the inlet valve 3 is shown as somewhat smaller than usual, for a reason to be explained, and that in the embodiment of the invention illustrated in Figures 5 and 6 the piston head is shown as beveled toward the central opening and the injection nozzle is extended so that it enters well into the auxiliary combustion chamber and somewhat further than is usual in engines of this type. In both embodiments the piston is shown as having formed in its head a toroidal auxiliarly combustion chamber 7 with a central protuberance 8 at its bottom to guide the air upward in a whirlwind column and as having an opening 9 which has a cross-sectional area substantially smaller than the cross-sectional area of the cylinder and smaller than that of the chamber itself at its widest part, the diameter of the opening being preferably from one-quarter to one-half of the diameter of the cylinder bore. The auxiliary chamber 7 and the injection nozzle 5 in both cases are preferably arranged with their axes in alinement with the axis of the cylinder 1. By the positioning of the inlet valve 3, or also it may be by the provision of a shroud or guide 10, the air admitted through the inlet valve 3 enters the cylinder 1 tangentially so that the air has a movement of rotation about the cylinder axis. As the piston 2, in both embodiments, approaches the upper dead center position, the air so admitted is forced toward the opening 9 with a substantially increased rotational velocity as it approaches the center, in accordance with a known physical law that under such circumstances the angular velocity increases in the inverse ratio of the square of the distance of the center of rotation. The fuel, whether as finely atomized sprays of liquid or partially vaporized, is directed in sprays or jets from the injection nozzle 5 toward the circumferential wall of the chamber 7 within the opening 9 (when the piston is in its upper dead center position) and, being highly heated by contact with the wall of the chamber, is quickly vaporized. As the air, moving into the chamber 7 in a generally spiral path and in contact with the wall of the chamber, reaches the bottom it is directed upward toward the opening 9 in a central whirlwind column indicated at 13. The arrowheaded lines indicate the movement of the air from the cylinder space between the head of the piston and the cylinder head into the chamber 7 and from the bottom of the chamber 7 in a central whirlwind column toward the injection nozzle 5 and finally, as the piston moves downward from its upper dead center position, from the chamber 7 into the main or cylinder combustion space between the piston and the cylinder head. In such movement the air passes through or is entered by the sprays of fuel as they leave the injection nozzle and again through the sprays of fuel as the air passes outward from the chamber 7 in the cylinder combustion space 11. The air so entering the chamber 7 takes up the fuel supply received through the injection nozzle 5, forming an intimate mixture which, reaching the central portion of the chamber 7, whirls upward or toward the cylinder head in a central whirlwind column and the last remnants of uncharged air meet the fuel from the injection nozzle, whereby the formation of the combustible mixture is continued in the cylinder combustion space 11.

Referring now more particularly to the embodiment of the invention illustrated in Figures 1, 2, 3 and 4 the air inlet is so reduced in area that the velocity of the air as it enters is increased as compared with usual practice with the result that the centrifugal force developed in the rotational movement of the air about the cylinder axis predominates over the force of the air which enters the chamber 7 through the opening 9 in a more or less radial direction under the influence of the displacement of the piston in its compression stroke. Such predominance is essential to the desired smoothness of operation of the engine, thoroughness of mixture of air and fuel, and completeness of combustion of the fuel without smoke.

Figure 4:
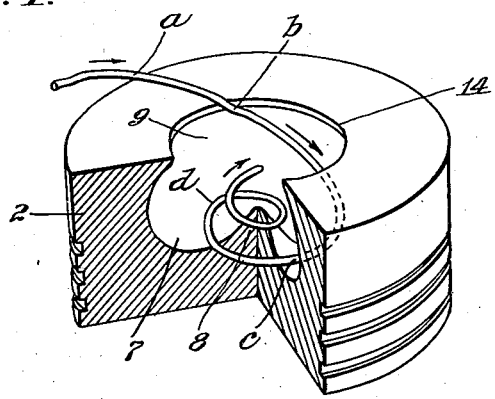
Figure 4 is a perspective view of the piston, partly in longitudinal section, illustrating the particular movement of an air particle.

In Figure 4 there is illustrated diagrammatically the movement of the air under the stated conditions which results in the improved operation of the engine. The path of movement of a single particle of the air, toward the end of the compression stroke of the piston, which may be taken as illustrative of the movement of the entire body of air, is represented by the double line a. Such movement of an air particle is influenced by the centrifugal force, due to the rapid rotational movement of the air, which tends to fling the particle outward, that is, away from the cylinder axis, and to the force of compression due to the displacement of the piston, which tends to drive the particle toward the cylinder axis. At a point b, at the edge 14 of the opening 9 in the piston head, the centrifugal force predominates over the inwardly directed radial force and as a result of such predominance the air particle enters the chamber 7 at the point b directly over the edge 14 in such a way as to flow slantwise with respect to the cylinder axis, on the peripheral wall of the chamber 7 and along the wall until it approaches a point c near the bottom of the chamber and thence inward toward the axis of the chamber in a spiral d, thence rising toward the injection nozzle 5 in a helical line from the central protuberance 8 at the bottom of the chamber. The aggregate of all of the air particles forms the whirlwind column 13 directed toward the injection nozzle.

It will be noted that in the combustion chamber the mixture of fuel and air, by reason of the discharge of the fuel in a radial direction, has imparted to it a movement of rotation about a circular axis centered around the longitudinal axis of the cylinder, and that at the same time, by reason of the introduction of the air in a tangential direction at such velocity that the centrifugal force with which the air enters the combustion chamber predominates over the radial force created by the displacement of the piston during the compression stroke, the mixture in the combustion chamber has imparted to it also a movement of rotation about the longitudinal axis of the cylinder in a plane at right angles to the axis of the cylinder. From this double movement of rotation of the mixture there results the herein described movement of the mixture in the combustion chamber which effects the intimate mixture of the air and fuel.

From the nozzle 5 the fuel is sprayed into the combustion chamber 7 in several sprays through the upper part of the central whirlwind column 13 below the edge 14 of the opening 9. At the beginning of the injection of fuel the air which forms the central whirlwind column, having already flowed along the hot wall of the combustion chamber 7, heats intensively the fuel as it issues from the nozzle so that only a slight ignition lag exists. The air rising in the whirlwind column and the air still entering the combustion chamber 7 from the cylinder space 11, under the influence of the piston displacement, before the piston reaches the dead center position, together flow along the wall of the combustion chamber to its bottom being at the same time intimately mixed with the fuel which leaves the injection nozzle.

At the beginning of the expansion stroke when the piston is moving away from the cylinder head the whirlwind column passes out from the chamber 7, through the opening 9 into the cylinder space 11, this movement of the whirlwind column from the chamber 7 being promoted by the suction effect of the piston 2. Thereby the last remnant of the uncharged air still present in the whirlwind column 13 flows through the fuel sprays from the injection nozzle, so that the last remnant of the fuel injected is also mixed with the air.

It will be understood that such movement of the air in the embodiment of the invention illustrated in Figures 1, 2, 3 and 4, necessary to the attainment of greater smoothness in operation of the engine, greater thoroughness of mixture of fuel and air, and more complete combustion of the fuel, is made possible by the predominance of the centrifugal force of the air from the inlet, due to its rotational velocity, over the force with which the air is forced into the combustion chamber by the piston displacement, such predominance of the centrifugal force being due in this instance to the increased velocity of the air from the inlet valve by reason of the restriction of the inlet.

Referring now more particularly to the embodiment of the invention illustrated in Figures 5 and 6 it will be seen that the piston top has an annular area 15 which is beveled downward toward the axis in the form of the surface of a truncated cone, whereby the clearance or vertical width of the cylinder space 11 increases toward the opening 9. As the piston 2 moves toward the cylinder head, that is, toward the upper dead center position, the air in the cylinder space 11 flows therefrom into the combustion chamber 7 through the opening 9. As the cylinder space 11, in this instance, increases in vertical width toward the cylinder axis the velocity component of the air forced by the piston displacement into the chamber 7 is materially diminished as the piston approaches the upper dead center position so that, without restriction of the usual air inlet, the centrifugal force of the air due to the rotational movement of the air predominates at the edge 14 of the combustion chamber opening 9 and the movement of the air in this instance is as already described with reference to Figure 4.

It is obvious that the desired predominance of the centrifugal force of the air may be accomplished by mechanical devices other than those chosen for illustration and explanation of the nature of this invention.

It is claimed:

In a direct injection internal combustion engine having a cylinder, a piston adapted to operate within said cylinder, a toroidal chamber located in the upper portion of said piston having a restricted entrance leading thereto through the top of said piston, a protuberance substantially centrally located of said piston head extending upwardly from the bottom of the said chamber, a nozzle located in said cylinder by which fuel is radially sprayed against the walls of the toroidal chamber in downwardly diverging jets, the walls of the said toroidal chamber being curved from the restricted entrance outwardly downwardly and inwardly toward the centrally located protuberance, the annular area of the piston top being beveled downwardly toward the axis in the form of the surface of a truncated cone, means for controlling the admission of air into said cylinder, whereby the air is tangentially whirled above the head of said piston and directed into the toroidal chamber by reason of the beveled piston top against the walls thereof and is axially whirled at high velocity upwardly around the protuberance from the bottom of the chamber.

ROSINA SAURER-HEGNER,
ANITA ELISABETH SAURER,
*Sole Heirs of the Estate of Hippolyt Saurer, Deceased.*